(12) United States Patent
Sato

(10) Patent No.: US 8,280,123 B2
(45) Date of Patent: Oct. 2, 2012

(54) AUTHENTICATION APPARATUS, REGISTRATION METHOD, COLLATION METHOD, AND PROGRAM

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1061 days.

(21) Appl. No.: 11/913,163

(22) PCT Filed: May 1, 2006

(86) PCT No.: PCT/JP2006/309440
§ 371 (c)(1),
(2), (4) Date: Oct. 30, 2007

(87) PCT Pub. No.: WO2006/118354
PCT Pub. Date: Nov. 9, 2006

(65) Prior Publication Data
US 2009/0067691 A1    Mar. 12, 2009

(30) Foreign Application Priority Data
May 2, 2005   (JP) ................................ P2005-134149

(51) Int. Cl.
*G06K 9/00* (2006.01)
(52) U.S. Cl. .................. 382/124; 382/154; 340/5.83
(58) Field of Classification Search .......... 382/124–127, 382/131, 154; 340/5.53, 5.83
See application file for complete search history.

(56) References Cited

U.S. PATENT DOCUMENTS

| | | | |
|---|---|---|---|
| 4,933,976 A * | 6/1990 | Fishbine et al. ............... | 382/127 |
| 5,144,680 A * | 9/1992 | Kobayashi et al. ............ | 382/124 |
| 6,314,197 B1 * | 11/2001 | Jain et al. ...................... | 382/125 |
| 6,597,802 B1 * | 7/2003 | Bolle et al. .................... | 382/124 |
| 6,795,570 B1 * | 9/2004 | Eichhorn et al. ............... | 382/124 |
| 2003/0091219 A1 * | 5/2003 | Martinez et al. ............... | 382/124 |
| 2004/0076340 A1 | 4/2004 | Nielsen | |
| 2004/0120556 A1 * | 6/2004 | Kono et al. ..................... | 382/124 |
| 2005/0047631 A1 * | 3/2005 | Zyzdryn ......................... | 382/124 |
| 2005/0129290 A1 * | 6/2005 | Lo et al. ......................... | 382/124 |
| 2005/0129292 A1 * | 6/2005 | Morgeneier et al. ........... | 382/124 |
| 2005/0249388 A1 * | 11/2005 | Linares .......................... | 382/124 |
| 2006/0120576 A1 * | 6/2006 | Chen .............................. | 382/124 |

FOREIGN PATENT DOCUMENTS

| | | |
|---|---|---|
| EP | 1 453 001 | 9/2004 |
| JP | 64-76368 | 3/1989 |
| JP | 64-076368 | 3/1989 |

(Continued)

OTHER PUBLICATIONS

Japanese Office Action for corresponding JP2005-134149 issued on Jun. 17, 2010. Japanese Office Action for corresponding JP 2005-134149 issued on Sep. 16, 2010.

*Primary Examiner* — Jon Chang
(74) *Attorney, Agent, or Firm* — K&L Gates LLP

(57) ABSTRACT

An authentication apparatus and authentication method which can improve the authentication accuracy are provided. The authentication apparatus consecutively picks up a biological authentication object of a predetermined biological part from different directions in series, and maps a plurality of images which are obtained as the consecutive image pickup result in series to a body of a figuration corresponding to the biological part with a point on the biological authentication object in the images being the criteria, and registers the respective images mapped to the body in a storage medium as information for collation with an image to be collated which is obtained by picking up an image from an arbitrary direction.

7 Claims, 9 Drawing Sheets

FOREIGN PATENT DOCUMENTS

| | | |
|---|---|---|
| JP | 06-243232 | 2/1994 |
| JP | 2003-248828 | 5/2003 |
| JP | 2003-178298 | 6/2003 |
| JP | 2003-331272 | 11/2003 |
| JP | 2004-164652 | 6/2004 |
| JP | 2005-071317 | 3/2005 |
| JP | 2005-71317 | 3/2005 |
| WO | 03/049030 | 6/2003 |

* cited by examiner

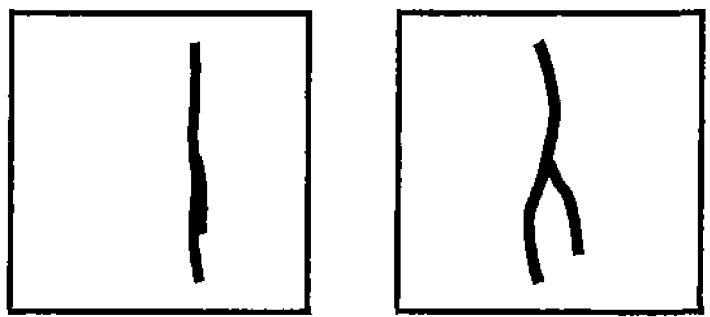
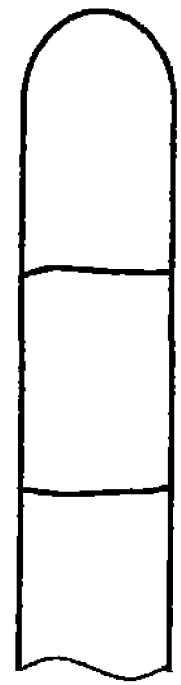
FIG. 9

AUTHENTICATION APPARATUS, REGISTRATION METHOD, COLLATION METHOD, AND PROGRAM

CROSS REFERENCE TO RELATED APPLICATIONS

The present application claims priority to Japanese Patent Application No. 2005-134149, filed in the Japanese Patent Office on May 2, 2005, the content of which is incorporated herein by reference.

BACKGROUND

In the past, as an object to be authenticated for the biometrics authentication, a blood vessel is used. In general, in an authentication apparatus, a finger is placed at a predetermined position, and an image of a blood vessel in the static finger is picked up. Then, the authentication apparatus registers an image of the blood vessel which is obtained as the result of the image picked up in a memory etc. as information to identify a biological body having the blood vessel, or compares the image with an image of the blood vessel which has been registered so as to determine whether or not a person of the blood vessel is an identical registrant (for example, refer to Jpn. Pat. Appln. Laid-Open Publication No. 2003-30632).

In this kind of authentication apparatus, at the time of the authentication, in case a finger is placed at a predetermined position with the state different from that at the time of registration even by a slight amount, as shown in FIG. 9, the curvature factor is changed even if the finger is the identical finger since the image pickup direction is different. Accordingly, there is raised a problem that the person is determined as a third party even if the person is an identical registrant, which consequently lowers the authentication accuracy.

SUMMARY

The present disclosure relates to an authentication apparatus, registration method, collation method, and program, which are desirably used in the case of authenticating a blood vessel as an object to be authenticated.

The present disclosure provides an authentication apparatus and authentication method which can improve the authentication accuracy.

To solve above-described problem, according to an embodiment, there is provided an authentication apparatus, including: a compensation means for compensating a plurality of images which are obtained by consecutively picking up a biological authentication object of a predetermined biological part from different directions in series such that the plural images obtained as the result of the consecutive image pickup result correspond to the surface figuration of the biological part; a attachment means for attaching the respective images compensated by the compensation means with a point on the biological authentication object in the images being the criterion; and a collation means for collating a group of images which are attached by the attachment means and an image to be compared which is obtained by picking up an image from an arbitrary direction.

According to the authentication apparatus, since a stereoscopic image that is substantially identical with an actual biological authentication object can be obtained by the compensation means and the attachment means, even if an image is picked up from any direction at the time of the collation, collation with an image to be collated can be performed by the collation means in consideration of the change of the curvature factor of the biological authentication object, which consequently can prevent the lowering of the authentication accuracy due to the change of the curvature factor.

According to an embodiment, there is also provided a registration method, including: a first step of compensating a plurality of images which are obtained by consecutively picking up a biological authentication object of a predetermined biological part from different directions in series such that the plural images obtained as the result of the consecutive image pickup result correspond to the surface figuration of the biological part; a second step of attaching the respective compensated images with a point on the biological authentication object in the images being the criterion; and a third step of registering a group of images which are attached in a storage medium as information for collation with an image to be collated which is obtained by picking up an image from an arbitrary direction.

According to the registration method, since a stereoscopic image that is substantially identical with an actual biological authentication object can be obtained by the first step and the second step, even if an image is picked up from any direction at the time of the collation, collation with an image to be collated can be performed in consideration of the change of the curvature factor of the biological authentication object, which consequently can prevent the lowering of the authentication accuracy due to the change of the curvature factor.

According to an embodiment, there is also provided a collation method, including: a first step of reading out registration information from a storage medium, in which a biological authentication object of a predetermined biological part is consecutively picked up from different directions in series, and a plurality of images which are obtained as the result of the consecutive image pickup result are compensated such that the plural images correspond to the surface figuration of the biological part, and the respective compensated images are attached with a point on the biological authentication object in the images being the criterion to be registered as the registration information; a second step of, based on the registration information, reconfiguring the respective images which are attached with a point on the biological authentication object being the criterion; and a third step of collating thus reconfigured respective images with an image to be collated which is obtained by picking up an image from an arbitrary direction.

According to the collation method, since a stereoscopic image group that is substantially identical with an actual biological authentication object can be obtained from a recording medium by the first step and the second step, even if an image to be collated is picked up from any direction, the image to be collated can be collated with the stereoscopic image group in consideration of the change of the curvature factor of the biological authentication object, which consequently can prevent the lowering of the authentication accuracy due to the change of the curvature factor.

According to an embodiment, there is also provided a program that makes an apparatus, to which a consecutive image pickup result of consecutively picking up a biological authentication object of a predetermined biological part from different directions in series is input, execute the processing, including: a first processing of compensating a plurality of images which are obtained by consecutively picking up a biological authentication object of a predetermined biological part from different directions in series such that the plural images obtained as the result of the consecutive image pickup result correspond to the surface figuration of the biological part; a second processing of attaching the respective compensated images with a point on the biological authentication object in the images being the criterion; and a third processing of registering a group of images which are attached in a storage medium as information for collation with an image to be collated which is obtained by picking up an image from an arbitrary direction.

According to the program, since a stereoscopic image that is substantially identical with an actual biological authentication object can be obtained by the first processing and the second processing, even if an image is picked up from any direction at the time of the collation, collation with an image to be collated can be performed in consideration of the change of the curvature factor of the biological authentication object, which consequently can prevent the lowering of the authentication accuracy due to the change of the curvature factor.

According to an embodiment, there is also provided a program that makes an apparatus execute the processing, including: a first processing of reading out registration information from a storage medium, in which a biological authentication object of a predetermined biological part is consecutively picked up from different directions in series, and a plurality of images which are obtained as the result of the consecutive image pickup result are compensated such that the plural images correspond to the surface figuration of the biological part, and the respective compensated images are attached with a point on the biological authentication object in the images being the criterion to be registered as the registration information; a second processing of, based on the registration information, reconfiguring the respective images which are attached with a point on the biological authentication object being the criterion; and a third processing of collating thus reconfigured respective images with an image to be collated which is obtained by picking up an image from an arbitrary direction.

According to the program, since a stereoscopic image group that is substantially identical with an actual biological authentication object can be obtained from a recording medium by the first processing and the second processing, even if an image to be collated is picked up from any direction, the image to be collated can be collated with the stereoscopic image group in consideration of the change of the curvature factor of the biological authentication object, which consequently can prevent the lowering of the authentication accuracy due to the change of the curvature factor.

According to an embodiment, by compensating a plurality of images which are obtained by consecutively picking up a biological authentication object of a predetermined biological part from different directions in series such that the plural images obtained as the result of the consecutive image pickup result correspond to the surface figuration of the biological part, and attaching the respective compensated images with a point on the biological authentication object in the images being the criterion, and collating an attached group of images and an image to be compared which is obtained by picking up an image from an arbitrary direction, since a stereoscopic image that is substantially identical with an actual biological authentication object can be obtained, even if an image is picked up from any direction at the time of the collation, collation with an image to be collated can be performed in consideration of the change of the curvature factor of the biological authentication object, which can realize improving the authentication accuracy.

Additional features and advantages are described herein, and will be apparent from, the following Detailed Description and the figures.

BRIEF DESCRIPTION OF THE FIGURES

FIG. 9 is a schematic view showing to explain the change of curvature factor of a blood vessel due to the image pickup direction.

DETAILED DESCRIPTION

An embodiment is described below referring to the accompanying drawings.

(1) Entire Configuration of an Authentication Apparatus

Figure 1:
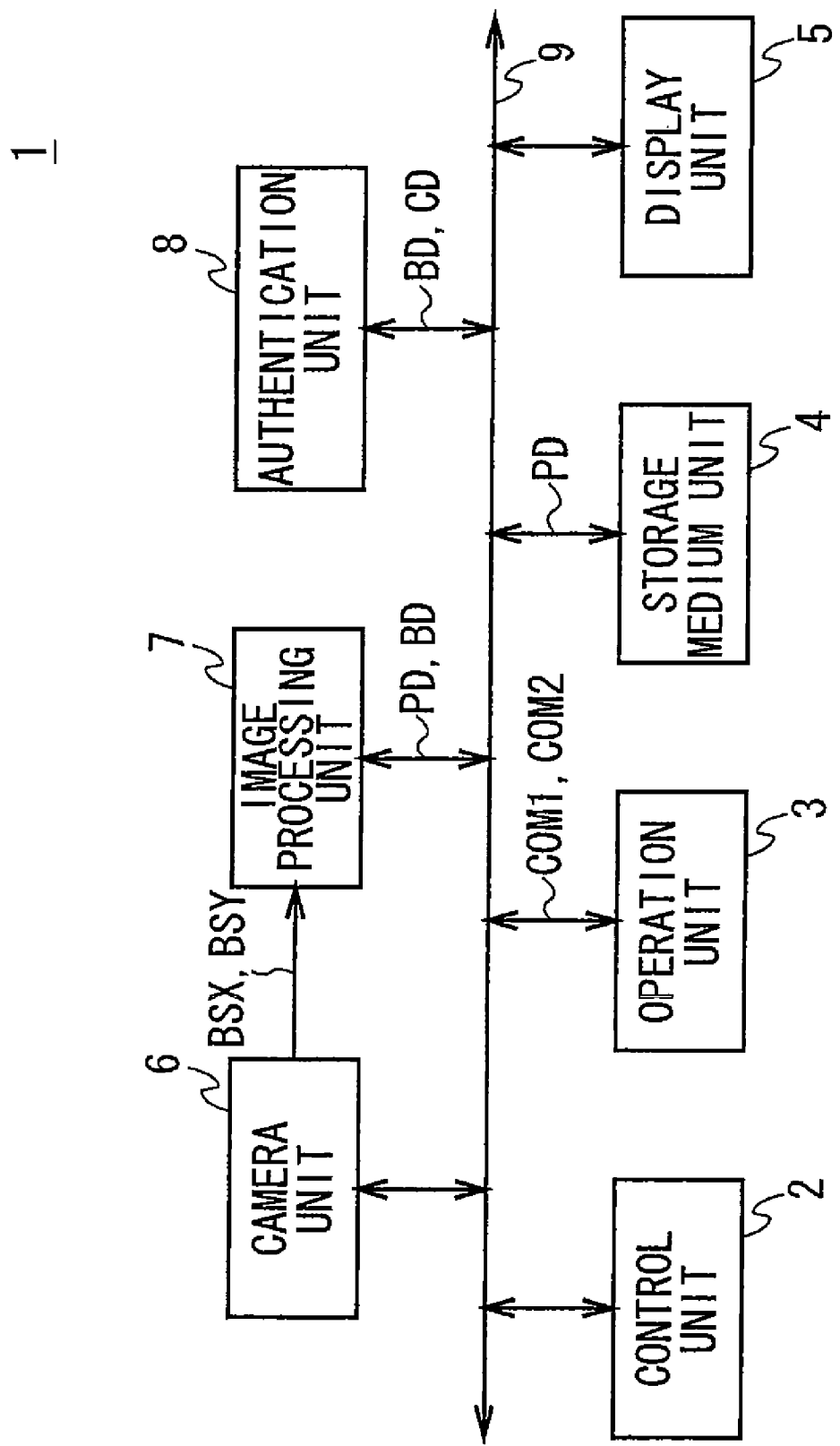
FIG. 1 is a block diagram indicative of the entire configuration of an authentication apparatus according to an embodiment.

FIG. 1 shows an authentication apparatus 1 according to an embodiment, and to a control unit 2 that controls the entire authentication apparatus 1, an operation unit 3, a storage medium unit 4, a display unit 5, a camera unit 6, an image processing unit 7, and an authentication unit 8 are connected through a bus 9.

The control unit 2 is a computer configuration which includes a CPU (Central Processing Unit) that controls the entire authentication apparatus 1, a ROM (Read Only Memory) in which various programs are stored, and a RAM (Random Access Memory) as a work memory of the CPU, and, to the control unit 2, according to the operation of the operation unit 3, an execution command COM1 for a mode to register a blood vessel of a registrant (referred to as an blood vessel registration mode, hereinafter) or an execution command COM2 for a mode to determine the existence of an identical registrant (referred to as an authentication mode, hereinafter) is given.

In case of receiving the execution command COM1 for the blood vessel registration mode from the operation unit 3, based on a corresponding program stored in the ROM, the control unit 2 sets the operation mode to the blood vessel registration mode and controls the camera unit 6 and image processing unit 7, and arbitrarily displays the control contents etc. to the display unit 5.

In this case, the camera unit 6 directs image pickup light in which a blood vessel existing in a finger is projected to the image pickup surface of an image pickup element through an optical system, and outputs a blood vessel image which is formed on the image pickup surface as an image signal (referred to as blood vessel image signal, hereinafter) BSX from the image pickup element.

The image processing unit 7 detects the blood vessel of the blood vessel image based on the blood vessel image signal BSX which is output in series from the camera unit 6 as an aggregate of points, and sends the aggregate of points to the control unit 2 as blood vessel formation pattern data PD.

When receiving the blood vessel formation pattern data PD, the control unit 2 registers the data by string the data in the storage medium unit 4, and stops controlling the camera unit 6 and image processing unit 7 respectively, and sets the operation mode from the blood vessel registration mode to the stop mode.

On the other hand, in case of receiving the execution command COM2 for the authentication mode from the operation unit 3, based on a corresponding program stored in the ROM, the control unit 2 sets the operation mode to the authentication mode and reads out the blood vessel formation pattern data registered in the storage medium unit 4 to send thus read out data to the authentication unit 8, and controls the camera unit 6, image processing unit 7, and authentication unit 8. Furthermore, the control unit 2 arbitrarily displays the control contents etc. on the display unit 5.

In this case, similarly to the blood vessel registration mode, the camera unit 6 outputs image pickup light in which a blood vessel existing in a finger is projected as a blood vessel image signal BSY, and the image processing unit 7 performs various preprocessing to represent the blood vessel as binary lines for the blood vessel image signal BSY, and sends a blood vessel image after the processing to the authentication unit 8 as data (referred to as blood vessel image data, hereinafter) BD.

The authentication unit 8 reconfigures a blood vessel from the aggregate of points represented in the blood vessel formation pattern data PD read out from the storage medium unit 4. Then, the authentication unit 8 collates thus reconfigured blood vessel and a blood vessel represented in the blood vessel image data BD sent from the image processing unit 7, and determines whether or not the user of the finger whose image is picked up by the camera unit 6 is a registrant according to the collation result.

Then, the authentication unit 8 generates data (referred to as authentication data, hereinafter) CD representing whether the user is a registrant or a third party based on the determination result, and sends the data to the control unit 2.

When receiving the authentication data CD, the control unit 2 transfers the data to an external device connected to the authentication apparatus 1, and stops controlling the camera unit 6, image processing unit 7, and authentication unit 8, and sets the operation mode from the authentication mode to the stop mode.

In this way, by performing the biometrics authentication to determine the existence of an identical person (registrant) using a blood vessel being a unique structural object existing at the inside of a biological body as an object to be authenticated, as compared with the case of using a fingerprint etc. existing at the surface of a biological body as an object to be authenticated, not only the direct steal from a biological body but also the impersonation to a registrant by a third party can be prevented.

(2) Method of Registering a Blood Vessel

In addition to above-described configuration, in the authentication apparatus 1, there is employed a blood vessel registration method in which a plurality of blood vessel images which are picked up consecutively from different directions in series are overlapped, and a blood vessel of thus overlapped blood vessel images (referred to as overlapped blood vessel image group, hereinafter) is registered as an aggregate of points of curves.

Figure 2:
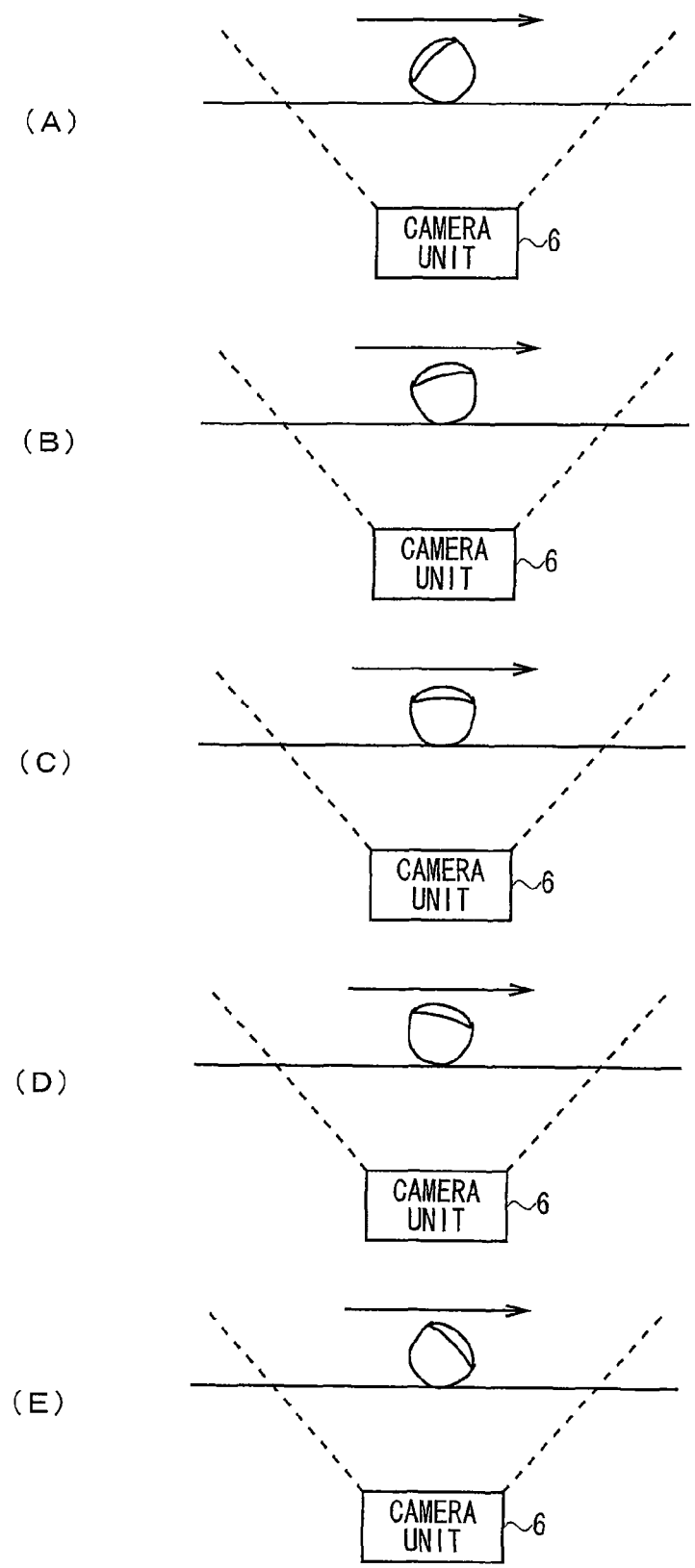
FIG. 2 is a schematic view showing to explain picking up images of a finger.

Actually, in the authentication apparatus 1, a blood vessel to be authenticated is picked up consecutively from different directions along the curvature of the finger pad surface, and in this embodiment, as shown in FIG. 2, a finger which is rotated along the curvature of the finger pad surface at a predetermined position is picked up consecutively by the camera unit 6 within the image pickup range of the camera unit 6.

Figure 3:
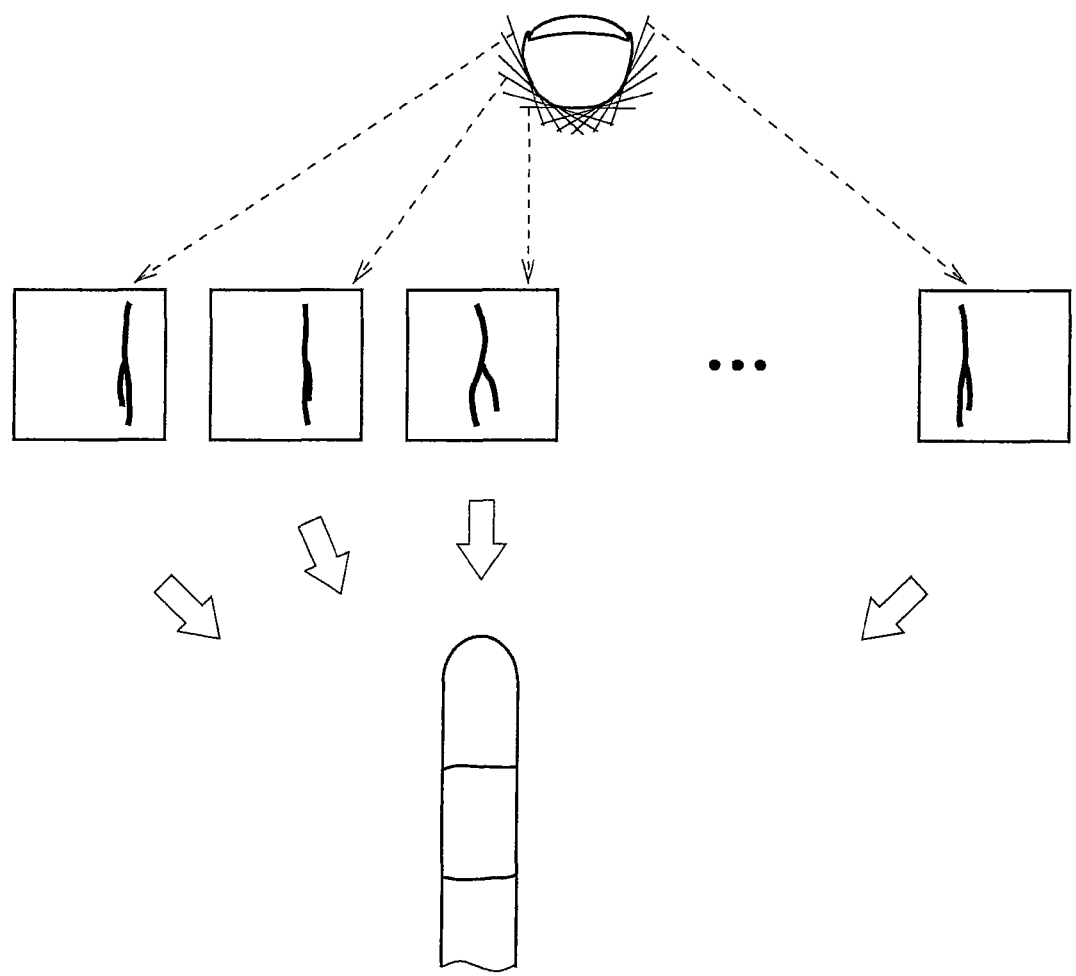
FIG. 3 is a schematic view showing to explain the relationship between the image pickup directions and blood vessel images.

Accordingly, on the respective blood vessel images based on a plurality of blood vessel image signals $BSX_i$ (i=1, 2, 3, ..., n (where "n" is an integer number)) output in series as the consecutive image pickup result, for example, as shown in FIG. 3, a blood vessel to be authenticated can be consecutively picked up from different directions respectively along the curvature of the finger pad surface.

Figure 4:
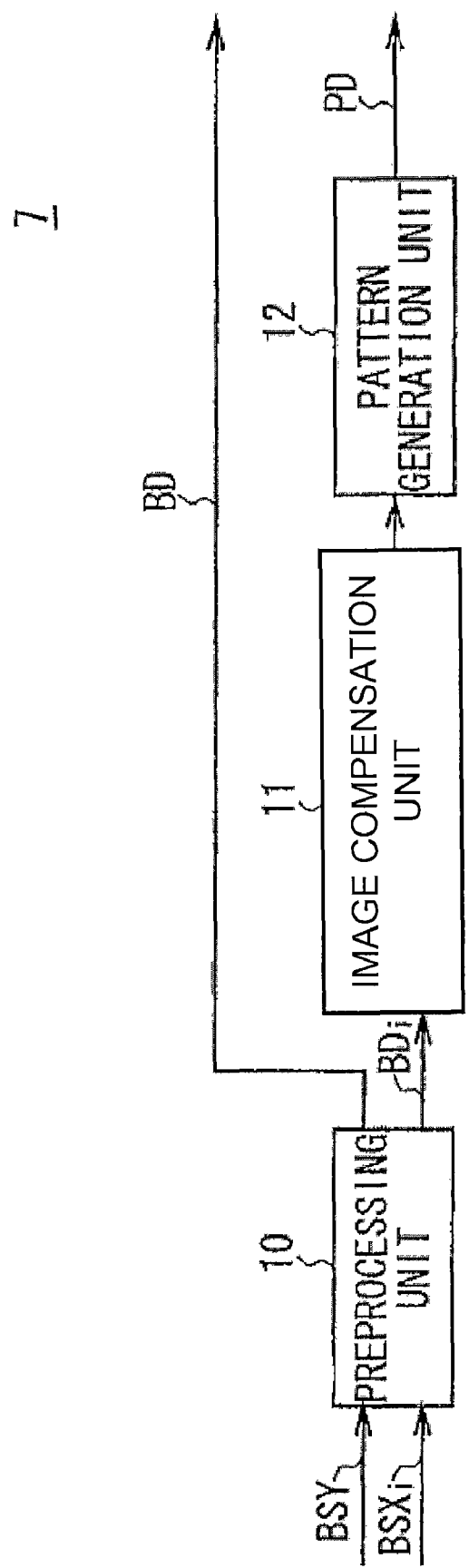
FIG. 4 is a block diagram indicative of the configuration of an image processing unit.

As shown in FIG. 4, the image processing unit 7 is configured by a preprocessing unit 10, an image compensation unit 11, and a pattern generation unit 12. The preprocessing unit 10 performs various filtering processing corresponding to the noise component removal, contour enhancement, and blood vessel linearization, binarization processing, etc. for the blood vessel image signals $BSX_i$ (i=1, 2, 3, ...) output from the camera unit 6 in series under a predetermined order, and generates blood vessel image data $BD_i$ of blood vessel images (referred to as binary blood vessel images, hereinafter) in series which represent linearized blood vessels (referred to as blood vessel lines, hereinafter) as binary data. Then, the preprocessing unit 10 sends the blood vessel image data $BD_i$ to the image compensation unit 11 in series.

The image compensation unit 11 compensates a plurality of blood vessel images picked up as planes such that the curvature corresponding to the finger pad surface is drawn (referred to as curvature compensation, hereinafter), and overlaps the respective blood vessel images for which the curvature compensation is performed to generate the overlapped blood vessel image group.

Figure 5:
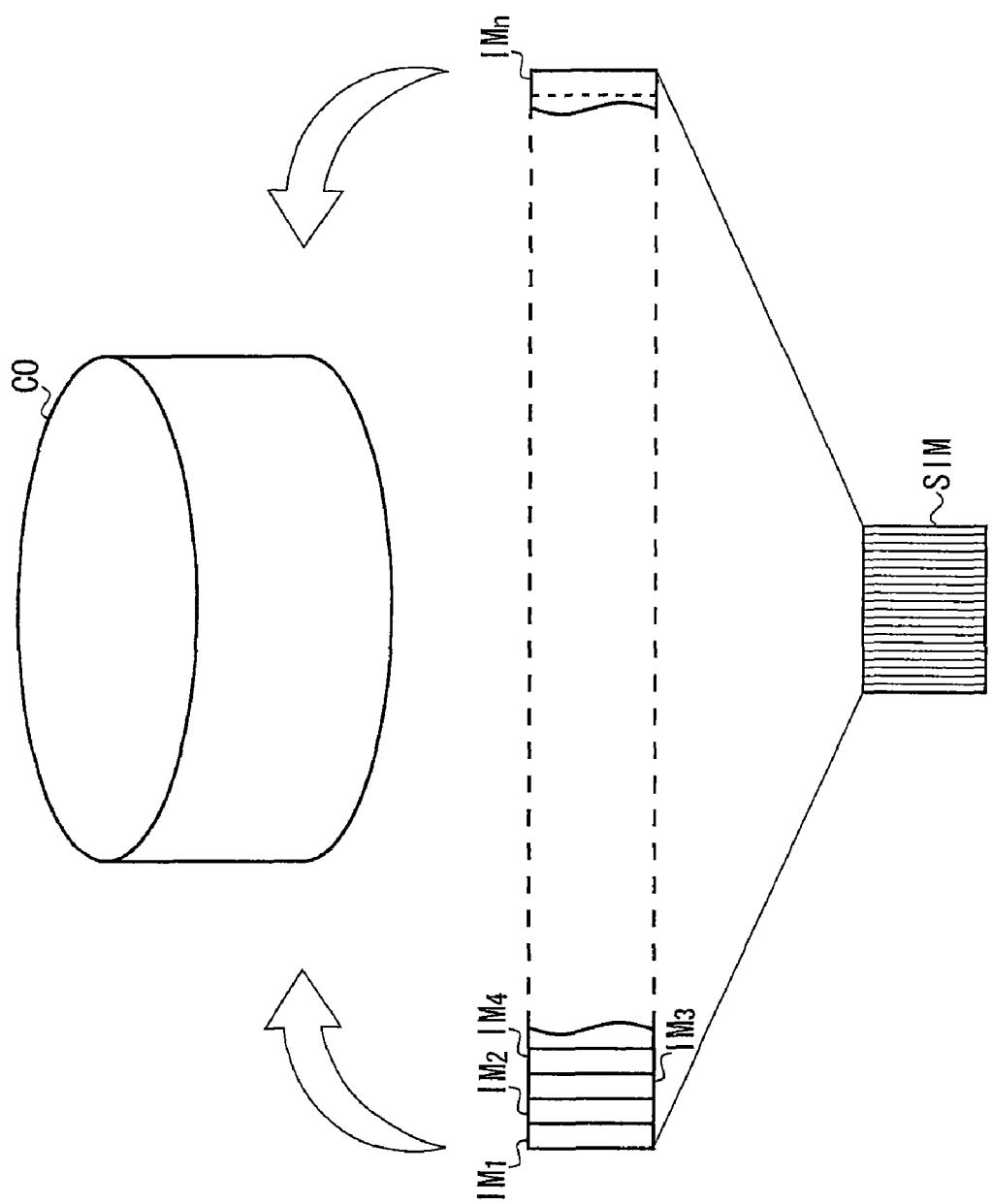
FIG. 5 is a schematic view showing to explain mapping a plurality of binary blood vessel images.

Specifically, for example, as shown in FIG. 5, the image compensation unit 11 performs the curvature compensation such that respective binary blood vessel images $IM_i$ based on the blood vessel image data $BD_i$ supplied from the preprocessing unit 10 are attached to the circumference surface of a body in the form of a cylinder (referred to as cylinder body, hereinafter) CO which is represented as figuration data retained in the control unit 2 in advance. Accordingly, the image compensation unit 11 can eliminate the projection distortion raised in the binary blood vessel images $IM_i$ which is brought about when an image of a blood vessel existing at the inside of a stereoscopic finger is picked up as a plane.

The curvature factor of the blood vessel lines in the binary blood vessel images $IM_i$ for which the curvature compensation is performed is changed according to the rotation of a finger, while the relative position of points of the terminal points and branch points (referred to as blood vessel feature points, hereinafter) of the blood vessel lines are not changed.

Accordingly, the image compensation unit 11 detects points of the terminal points and branch points (referred to as blood vessel feature points, hereinafter) on the blood vessel lines in the respective binary blood vessel images $IM_i$ respectively for which the curvature compensation is performed, and overlaps the binary blood vessel images $IM_i$ such that blood vessel lines of the same curvature factor are overlapped with the blood vessel feature points being the criteria to generate an overlapped blood vessel image group SIM.

In this way, by overlapping the binary blood vessel images $IM_i$ with their projection distortion eliminated by the curvature compensation, as compared with the case of simply overlapping the binary blood vessel images $IM_i$, the image compensation unit 11 can avoid the deviance of the connection points between the blood vessel lines of the same curvature factor and the blood vessel lines of different curvature factors, and consequently can generate the overlapped blood vessel image group SIM configured by blood vessel lines of curvature factors of the blood vessels which are picked up from a plurality of directions in the state of approximating an actual blood vessel.

On the other hand, the pattern generation unit 12 approximates the blood vessel lines in the overlapped blood vessel image group SIM using curves, and generates an aggregate of plural points on thus approximated curves as the blood vessel formation pattern data PD.

Figure 6:
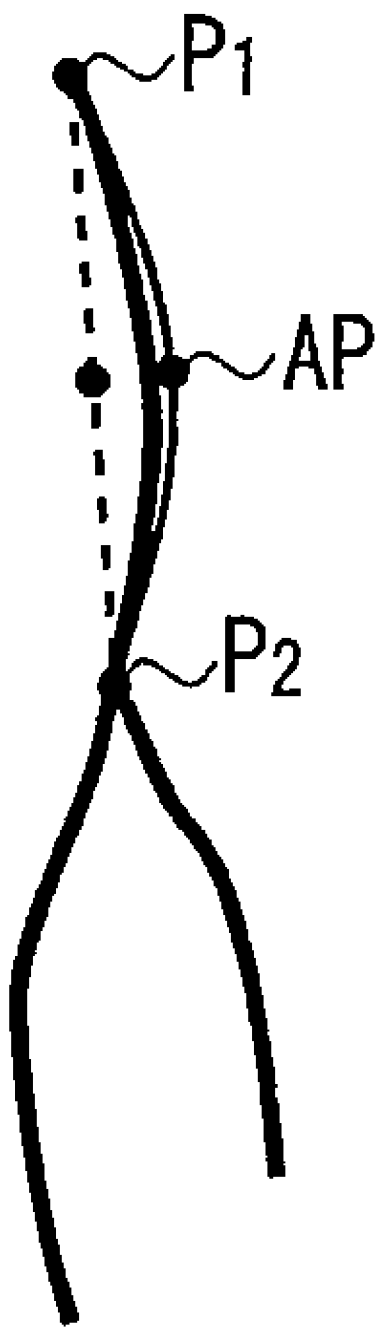
FIG. 6 is a schematic view showing to explain the curve approximation.

Specifically, with respect to the plural blood vessel feature points on the blood vessel lines, every two blood vessel feature points which are adjacent to each other, for example, as shown in FIG. 6, with the middle point of a line connecting two blood vessel feature points $P_1$ and $P_2$ set to an anchor point AP, the pattern generation unit 12 shifts the anchor point AP to a position to approximate the blood vessel line between the blood vessel feature points $P_1$ and $P_2$ to the utmost extent, thereby performing the curve approximation.

Then, the pattern generation unit 12 generates the respective blood vessel feature points $P_k$ (k=2, 3, ..., m (where "m" is an integer number)) in the overlapped blood vessel image group SIM and the anchor point $AP_{k-1}$ between the blood vessel feature points as the blood vessel formation pattern data PD, and registers the data in the storage medium unit 4 (FIG. 1) through the control unit 2 (FIG. 1).

In this way, since the authentication apparatus 1 attaches the blood vessel images picked up as planes to a stereoscopic body, and generates blood vessels in the overlapped blood vessel image group attached to the stereoscopic body as an aggregate of points of curves, it becomes possible to register points on a blood vessel which is generated by approximating an actual blood vessel existing stereoscopically at the inside of a finger as the blood vessel formation pattern data PD.

(3) Authentication Method

Next, the authentication method using the overlapped blood vessel image group is explained.

In this embodiment, at the time of the authentication, different from the time of the registration, the authentication apparatus 1 uses the camera unit 6 to pick up an image of a finger whose arbitrary finger pad surface is placed at a predetermined position within the image pickup range of the camera unit 6, and various processing is performed for the blood vessel image signal BSY (FIG. 4) which is obtained as the result of the image pickup at the preprocessing unit 10 (FIG. 4) of the image processing unit 7, and the blood vessel image data BD (FIG. 4) representing the binary blood vessel images which are obtained as the result of the processing is sent to the authentication unit 8.

The authentication unit 8 reconfigures the overlapped blood vessel image group SIM (FIG. 5) based on the respective blood vessel feature points $P_k$ and anchor point $AP_{k-1}$ represented in the blood vessel formation pattern data PD read out from the storage medium unit 4, and collates blood vessel lines between the overlapped blood vessel image group SIM and the binary blood vessel images represented in the blood vessel image data BD supplied from the preprocessing unit 10.

Figure 7:
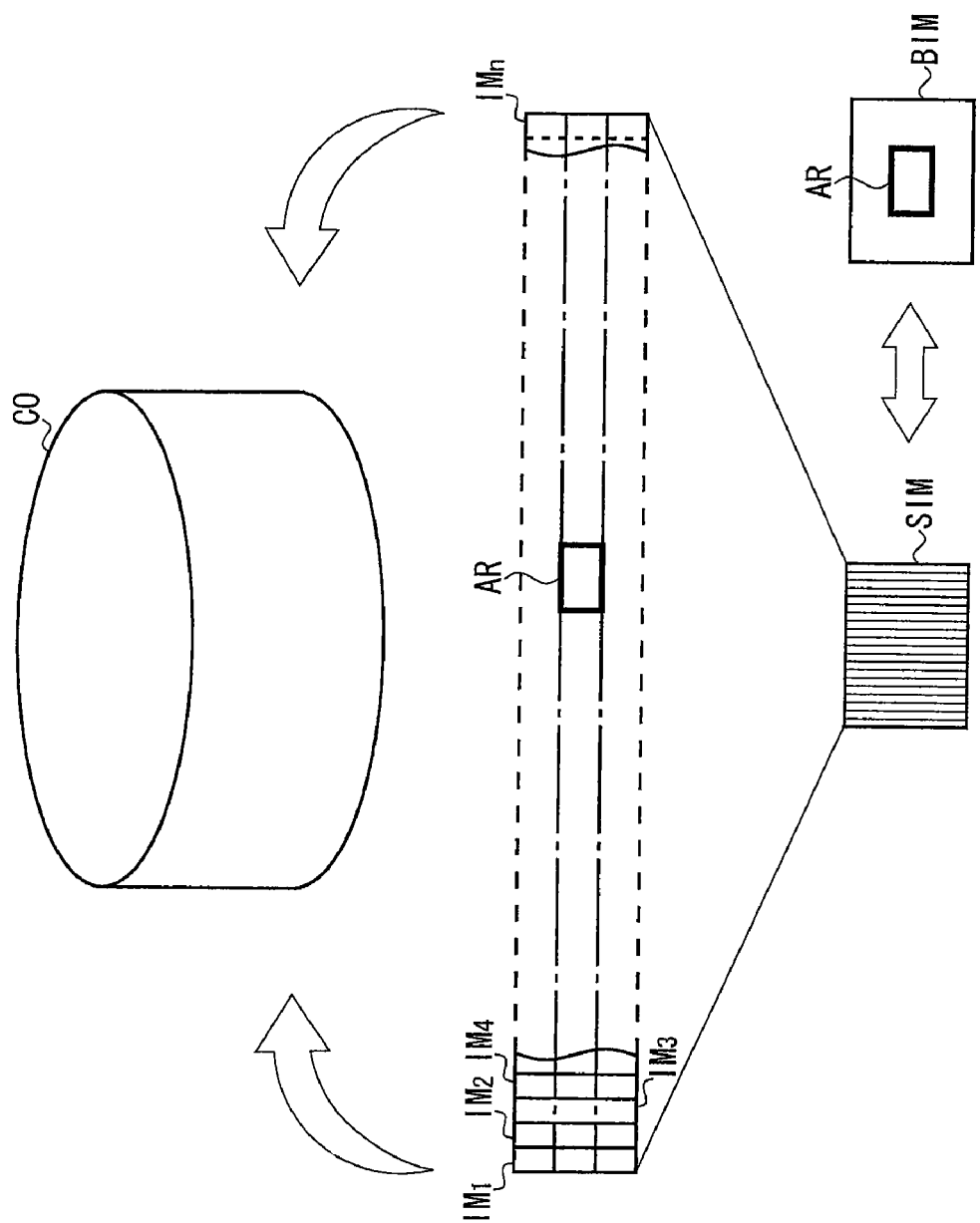
FIG. 7 is a schematic view showing to explain collating blood vessel lines.

Specifically, for example, as shown in FIG. 7, as a region in which the projection distortion is not raised based on the image pickup condition etc., a region of a predetermined range with the center of the image being the criterion (referred to as image central region, hereinafter) AR is set up in advance, and the authentication unit 8 obtains the correlation value between the overlapped blood vessel image group SIM and a binary blood vessel image BIM with respect to the image central region AR, and detects the position of the overlapped blood vessel image group SIM whose correlation value with respect to the binary blood vessel image BIM is largest.

Accordingly, the authentication unit 8 can specify a position corresponding to a direction along which the binary blood vessel image BIM is picked up without being affected by the projection distortion raised in the binary blood vessel image BIM which is brought about since an image of a blood vessel existing stereoscopically at the inside of a finger is picked up as a plane.

Figure 8:
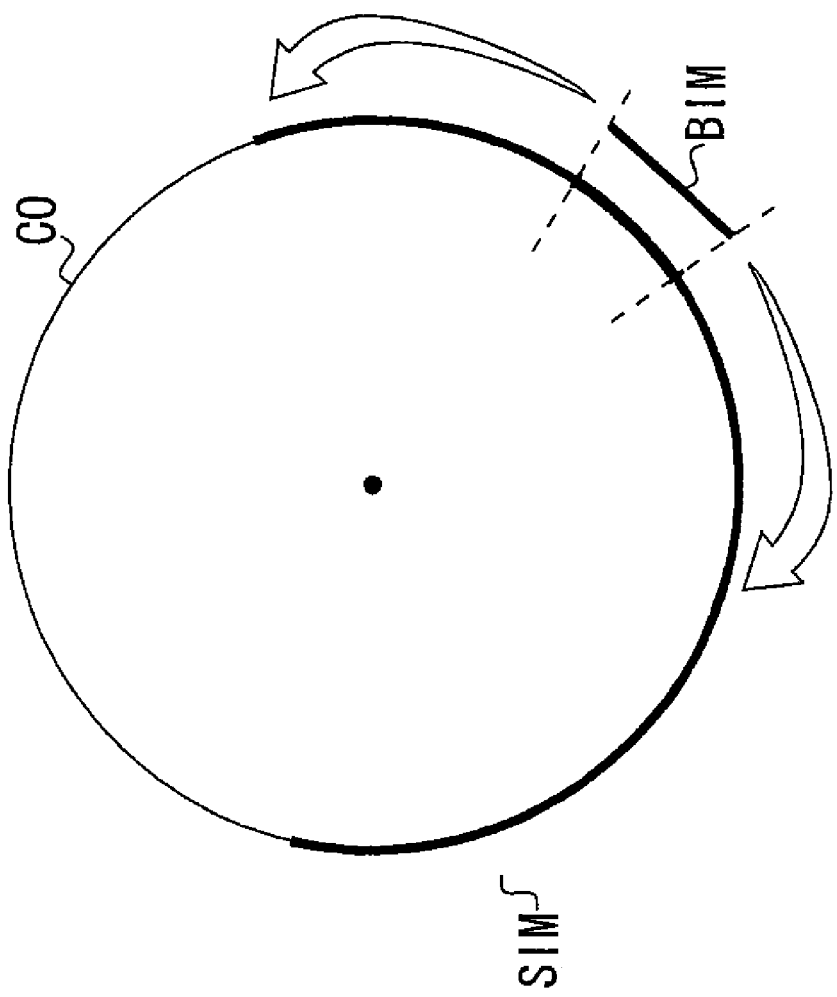
FIG. 8 is a schematic view showing to explain mapping a binary blood vessel image.

Then, as shown in FIG. 8, the authentication unit 8 overlaps the binary blood vessel image BIM for which the curvature compensation is performed such that the binary blood vessel image BIM is attached to the circumference surface of the cylinder body CO similarly as the time of registration at the overlapped blood vessel image group SIM such that the blood vessel lines of the same curvature factor are overlapped.

Accordingly, the authentication unit 8 can set the binary blood vessel image BIM to the same state at the time of registration without forcing the user to pick up an image of the finger pad surface such that the image pickup direction thereof is identical with that at the time of registration.

In the state, the authentication unit 8 obtains the correlation value between the binary blood vessel image BIM and the corresponding overlapped blood vessel image group SIM, and generates the authentication data CD according to whether or not the correlation value is equal to or more than a minimum value to determine that the person is a registrant (referred to as registrant determination threshold value, hereinafter), and sends the data to the control unit 2.

In this way, the authentication apparatus 1 uses the overlapped blood vessel image group SIM not only as an object to be authenticated but also as a parameter to compensate the curvature factor due to the difference of the image pickup direction in the binary blood vessel image BIM, which can lower the memory capacity of the storage medium unit 4 and processing burden in the authentication unit 8 to improve the authentication accuracy as compared with the case in which all the images based on the blood vessel image signals $BSX_i$ (FIG. 4) which are obtained by picking up images of a blood vessel to be authenticated consecutively from different directions are registered as object to be collated.

(4) Operation and Effect

In above-described configuration, in the authentication apparatus 1, by consecutively picking up images of a blood vessel of a finger from different directions in series, and mapping the binary blood vessel images $IM_i$ (FIG. 5) which are obtained as the consecutive image pickup result to the cylinder body CO (FIG. 5) with the blood vessel feature points on the blood vessel lines in the images being the criteria such that parts where the blood vessel lines overlap are overlapped to generate the overlapped blood vessel image group SIM (FIG. 5).

Accordingly, the authentication apparatus 1 can generate the stereoscopic overlapped blood vessel image group SIM that is substantially identical with an actual blood vessel.

Accordingly, in case of collating the binary blood vessel image BIM to be collated which is obtained after the image pickup result with the binary blood vessel images $IM_i$ of the overlapped blood vessel image group SIM, even if the binary blood vessel image BIM is picked up from any direction, the authentication apparatus 1 can collate with the binary blood vessel image BIM of the overlapped blood vessel image group SIM corresponding to the direction.

Accordingly, without forcing the user to pick up an image of the finger pad surface such that the image pickup direction thereof is identical with that at the time of registration exactly, the authentication apparatus 1 can perform the collation in consideration of the change of the curvature factor of a blood vessel corresponding to the image pickup direction at the time of collation, which can consequently realize collation of blood vessel lines of high accuracy.

Furthermore, the authentication apparatus 1 approximates the blood vessel lines of the overlapped blood vessel image group SIM with curves, and stores an aggregate of a plurality of points of thus approximated curves in the storage medium unit 4 as the blood vessel formation pattern data PD, and, at the time of collation, reads out the blood vessel formation pattern data PD from the storage medium unit 4 to reconfigure the overlapped blood vessel image group SIM.

Accordingly, the authentication apparatus 1 can not only reduce the storage occupied area of the storage medium unit 4 for the overlapped blood vessel image group SIM significantly but also retain and collate with the state substantially identical with a blood vessel being an actual smooth curve, which can realize collation of blood vessel lines with high accuracy.

According to above described configuration, by mapping the binary blood vessel images $IM_i$ which are obtained as the consecutive image pickup result from different directions in series to the cylinder body CO (FIG. 5) in series with the blood vessel feature points on the blood vessel lines in the images being the criteria, and collating thus mapped respective binary blood vessel images $IM_i$ with the binary blood vessel image BIM which is obtained as the result of image pickup from an arbitrary direction, it becomes possible to obtain a stereoscopic image that is substantially identical with an actual biological authentication object. Accordingly, even if an image is picked up from any direction at the time of the collation, collation with an image to be collated can be performed in consideration of the change of the curvature factor of the blood vessel, which can realize improving the authentication accuracy.

(5) Other Embodiments

In above-described embodiment, as a biological authentication object of a predetermined biological part, a blood vessel of a finger is employed to which the present invention is not restricted, and a biological authentication object of other various biological parts can be employed such as a blood vessel of an eye, leg, or palm, a fingerprint of a finger, leg, or palm, a mouthprint of a mouth.

Furthermore, in above above-described embodiment, as a method to generate a body corresponding to the surface figuration of a biological part, figuration data indicative of a body in the form of a cylinder (cylinder body CO (FIG. 5)) corresponding to the finger pad surface of a finger is stored in advance and the figuration data is read out, to which the present invention is not restricted, and there may be employed a configuration in which data representing the radius of a cylinder is stored in advance and the cylinder body CO is generated based on the data at the time of registration for each time. In above described configuration, while the thickness of a blood vessel existing at a finger is not taken into consideration, the thickness may be taken into consideration by shifting the focus position with a predetermined interval in the thickness direction, and employing the method of forming the overlapped blood vessel image group for thus shifted focus position.

Moreover, as the figuration, in above above-described embodiment, while a cylinder is employed, other various figurations corresponding to the surface figuration of a biological part such as an ellipse cylinder or a sphere may be employed.

Yet moreover, in the above-described embodiment, as a method of consecutively picking up a biological authentication object of a biological part from different directions in series, the case of consecutively picking up a finger that rotates along the curvature of the finger pad surface is explained, to which the present invention is not restricted, and the case of consecutively picking up a stationary finger by rotating the camera unit 6 along the curvature of the finger pad surface of the finger.

Yet moreover, in the above-described embodiment, as collation means for collating a group of images which are attached by attachment means and an image to be compared which is obtained by picking up an image from an arbitrary direction, the case of detecting the image part of the overlapped blood vessel image group SIM whose correlation value with the binary blood vessel image BIM is largest with respect to the image central region AR (FIG. 7), and, after mapping the binary blood vessel image BIM to thus detected image part (FIG. 8), collating the blood vessel lines between the binary blood vessel image BIM and the corresponding overlapped blood vessel image group SIM is explained, to which the present embodiment are not restricted, and there may be employed a configuration in which, by peeling off a binary blood vessel image corresponding to the image part of thus detected overlapped blood vessel image group SIM from the cylinder body CO, a binary blood vessel image which represents the image part as a plane is generated, and blood vessel lines between the binary blood vessel image and the binary blood vessel image BIM are collated.

In this case, the curvature factor of blood vessel lines in the binary blood vessel image as a plane which is peeled off from the cylinder body CO is compensated under the condition same as that of the binary blood vessel image BIM which is picked up from the same image pickup direction, which can bring about an effect similar to that in above-described embodiment.

Furthermore, as another method, for example, there may be employed a configuration in which, by mapping the binary blood vessel image BIM to the overlapped blood vessel image group SIM (cylinder body CO), blood vessel lines between thus mapped binary blood vessel image BIM and the overlapped blood vessel image group SIM are collated such that the overlapped blood vessel image group SIM is rotated.

In case of employing the method, while the processing burden is made large, since the binary blood vessel image BIM and the overlapped blood vessel image group SIM are directly collated, the authentication accuracy can be improved.

Yet moreover, in the above-described embodiment, as retention means for retaining a biological authentication object in a group of images which are attached by an attachment means as an aggregate of points of curves, the storage medium unit 4 in the authentication apparatus 1 is employed, to which the present embodiment are not restricted, and a storage medium at the outside of the authentication apparatus 1 may be employed, or a recording medium that can be arbitrarily connected to the authentication apparatus 1 may be employed.

Furthermore, as the method of setting a biological authentication object to an aggregate of points of curves, for example, other various curve functions or the Bezier function, B-spline function, etc. may be employed.

Yet moreover, in the above-described embodiment, the first function of generating the overlapped blood vessel image group SIM and registering the group in the storage medium unit 4 and the second function of collating the overlapped blood vessel image group SIM and the binary blood vessel image BIM to be collated are loaded in the single authentication apparatus 1, to which the present embodiments are not restricted, and, according to the authentication use application etc., the authentication apparatus 1 may be separated to an apparatus in which the first function is loaded and an apparatus in which the second function is loaded.

Yet moreover, in the above-described embodiment, the stereoscopic blood vessel registration method in the image processing unit 7 and the authentication method in the authentication unit 8 are realized by hardware, to which the embodiments are not restricted, and these methods may be realized by software using a program that makes a computer device execute the methods.

The present embodiments can be utilized to the case of authenticating the features of a blood vessel of a biological body as an object to be authenticated.

EXPLANATION OF REFERENCE SYMBOLS

1—Authentication Apparatus
2—Control Unit
3—Operation Unit
4—Storage Medium Unit
5—Display Unit
6—Camera Unit
7—Image Processing Unit
8—Authentication Unit
9—Bus
10—Preprocessing Unit
11—Image Compensation Unit
12—Pattern Generation Unit
COM1, COM2—Execution Command
BSX, BSY—Blood Vessel Image Signal
BD—Blood Vessel Image Data
PD—Blood Vessel Formation Pattern Data
CD—Authentication Data
IM, BIM—Binary Blood Vessel Image
SIM—Overlapped Blood Vessel Image Group
P—Blood Vessel Feature Point
AP—Anchor Point
AR—Image Central Region It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An authentication apparatus comprising:
a processor; and
a memory device storing instructions which when executed by the processor, cause the processor to:
(a) acquire a plurality of images which are obtained by consecutively picking up a biological authentication object of a predetermined biological part from different directions in series such that the plural images correspond to a surface figuration of the predetermined biological part;
(b) detect points of the plurality of images;
(c) using the detected points, map the plurality of images to a body corresponding to the surface figuration of the predetermined biological part; and
(d) collate a group of the plurality of images and an image to be compared which is obtained by picking up an image from an arbitrary direction.

2. The authentication apparatus of claim 1, wherein the instructions, when executed by the processor, cause the processor to perform curvature compensation for the plurality of images such that the plurality of images are mapped to a cylinder body corresponding to the surface figuration of the predetermined biological part.

3. The authentication apparatus of claim 1, wherein:
(a) the predetermined biological part includes a finger having a surface figuration; and
(b) the instructions, when executed by the processor, cause the processor to perform curvature compensation so as to correspond to the surface figuration of the finger.

4. The authentication apparatus of claim 1, wherein the instructions, when executed by the processor, cause the processor to map the plurality of images such that parts of the biological authentication object in the images are overlapped.

5. The authentication apparatus of claim 1, wherein the biological authentication object includes a blood vessel.

6. A method of operating an authentication apparatus, the method comprising:
(a) acquiring a plurality of images which are obtained by consecutively picking up a biological authentication object of a predetermined biological part from different directions in series such that the plural images correspond to a surface figuration of the predetermined biological part;
(b) detecting points of the plurality of images;
(c) using the detected points, mapping the plurality of images to a body corresponding to the surface figuration of the predetermined biological part; and
(d) registering a group of the plurality of images as information for collation with an image to be collated which is obtained by picking up an image from an arbitrary direction.

7. A non-transitory computer-readable medium including executable instructions that when executed by a processor causes an apparatus to:
(a) acquire a plurality of images which are obtained by consecutively picking up a biological authentication object of a predetermined biological part from different directions in series such that the plural images correspond to a surface figuration of the predetermined biological part;
(b) detect points of the plurality of images;
(c) using the detected points, map the plurality of images to a body corresponding to the surface figuration of the predetermined biological part; and
(d) register a group of the plurality of images as information for collation with an image to be collated which is obtained by picking up an image from an arbitrary direction.

* * * * *